United States Patent [19]
Baermann

[11] 3,784,945
[45] Jan. 8, 1974

[54] PERMANENT MAGNET FOR SUSPENSION BEARINGS

[76] Inventor: Max Baermann, 506 Bensberg, Bezerk Cologne, Germany

[22] Filed: Feb. 7, 1973

[21] Appl. No.: 330,247

[30] Foreign Application Priority Data
June 28, 1972 Germany.................... P 22 31 591.9

[52] U.S. Cl.................................. 335/302, 308/10
[51] Int. Cl............................................. H01f 7/02
[58] Field of Search.................... 335/302, 303, 304, 335/306; 308/10

[56] References Cited
UNITED STATES PATENTS
3,326,610 6/1967 Baermann............................ 308/10
3,233,950 2/1966 Baermann............................ 308/10
3,257,586 6/1966 Steingroever....................... 335/303
3,378,315 4/1968 Webb.................................... 308/10

*Primary Examiner*—George Harris
*Attorney*—James H. Tilberry et al.

[57] ABSTRACT

A permanent magnet is formed from a mixture of powdered permanent magnet material and a synthetic resin binder. The magnet includes first and second layers. One layer has a coercivity substantially greater than the second layer.

14 Claims, 2 Drawing Figures

PATENTED JAN 8 1974          3,784,945

3,784,945

PERMANENT MAGNET FOR SUSPENSION BEARINGS

BACKGROUND OF THE INVENTION

This application pertains to the art of permanent magnets, and more particularly to permanent magnets formed from a mixture of powdered permanent magnet material and a synthetic resin binder. The invention is particularly applicable to permanent magnets used in magnetic suspension bearings for electricity meters and will be particularly described with reference thereto. However, it will be appreciated that the invention has broader applications and the improved magnet may be used in other devices.

Magnetic suspension bearings for electricity meters commonly include a pair of permanent magnets, each having a generally cylindrical shape. The magnets have flat surfaces which face one another across an air gap. Lines of magnetic force from the two magnets interact in the air gap so that the two magnets repulse one another to provide a magnetic suspension bearing.

In magnetic suspension bearings of the type described, it is extremely important that the flat surfaces facing one another have a homogeneous magnetization which does not change. That is, the magnetic field should be substantially constant.

Although it is possible to manufacture such magnets with uniform and homogeneous magnetization, it is difficult to maintain such magnetization when the bearing is assembled. Such magnets are susceptible to demagnetizing influences when they contact other permanent magnet members of ferro-magnetic members. Such contacts frequently occur during handling of the magnets and assembly of the magnetic suspension bearing. In spite of careful handling and assembly of the magnets in a suspension bearing, contact sometimes occurs. Such contact demagnetizes one or the other of the magnets in a localized area. This results in magnetization which is not homogeneous or symmetrical on one or both of the magnets. Without a homogeneous magnetization, the suspension force and torque may vary. In addition, holding points may occur which disturb the measuring value or prevent the meter from starting at a small load.

In addition to the desirable property of homogeneous magnetization, it is also desirable that the induction of the permanent magnets be relatively unaffected by changes in temperature. When the induction of the permanent magnets changes greatly with changing temperatures, the width of the air gap varies due to axial displacement. Severe axial displacement of the rotating parts may result in contact between the driving and driven members.

In previous arrangements of the type described, the permanent magnets have been made from a material having a high coercivity so that they are very stable against demagnetizing influences. However, such previous materials have a high negative coefficient of induction with changes in temperature. For example, a magnet made from a material having a high coercivity to resist demagnetizing influences may have a change in induction of around 2 percent with a temperature change of 10° C. In order to use such permanent magnet material in permanent magnetic bearings, it is common to use a temperature compensation shunt material leading to the active magnetic field. Such material has an increasing magnetic resistance substantially the same as the induction of the permanent magnet. However, such a temperature compensation shunt material short circuits a part of the useful magnetic field. In addition, the temperature compensation shunt material usually consists of an alloy including iron with around 30 percent nickel. Such material is expensive and cannot always be produced with values which are constant. Thus, the increasing resistance of the magnetic shunt material cannot exactly match the changing induction value of the magnetic material with changing temperatures.

In previous arrangements of the type described, permanent magnet material has been used having a very low change in inductance with change in temperature. For example, materials are available providing a change of around 0.2 percent change in inductance for every 10° C. change in temperature. However, such materials exhibit the problem of being susceptible to demagnetizing influences.

As previously explained, previous permanent magnets for use in magnetic suspension bearings have exhibited two problems. If the magnetic material is chosen to have a high coercivity, in order to reduce demagnetizing influences, temperature compensation shunts have been required. If the magnetic material is chosen to have a low change in inductance with changing temperature, the material is susceptible to demagnetizing influences.

In previous attempts to overcome the problems of the type described, it is known to produce permanent magnets from a mixture including two different permanent magnet materials or alloys and a binder. In this specification, it should be recognized that alnico refers to an alloy formed from iron, nickel, aluminum and cobalt. The alloy is usually powdered and mixed with a synthetic resin binder when formed into a permanent magnet of a desired shape. In using the term alnico, it should be recognized that it refers to magnets made from such alloys.

In previous arrangements, it is known to manufacture permanent magnets from two different permanent magnet materials homogeneously mixed with a synthetic resin binder. For example, it is known to mix two different alloys of alnico with phenol-formaldehyde type resins, with one alloy having a higher remanence than the other. When a magnet of such mixtures is formed, it has commonly been considered necessary that the coercive forces of the two alloys differ from one another by not more than around 20 percent. With magnets of such materials, it has been found that no substantial improvement in magnetic properties is achieved.

It is also known to produce magnets formed from a homogeneous mixture including alnico and a permanent magnet material having the nature of barium ferrite and a synthetic resin.

It had previously been expected that mixing different magnetic materials having different magnetic values regarding their remanence and coercive forces would result in a material having certain values exceeding the values of the individual materials.

In the case of a magnet molded from alnico alone, the energy product lies at around $0.68 \times 10^6$ gauss oersted. Regardless of the different alloys used in the mixture, such magnets are highly susceptible to demagnetizing influences.

In the case where alnico material is mixed with material having the nature of barium ferrite, a magnet is produced having a mean energy value of around $0.66 \times 10^6$ gauss oersted. A permanent magnet molded from barium ferrite alone has an energy product of around $0.52 \times 10^6$ gauss oersted.

In comparing a permanent magnet molded from barium ferrite or similar material with the mixture of alnico and barium ferrite, it is noted that the energy value is increased by around $0.0014 \times 10^6$ gauss oersted. However, it has been found that the coercive force of the mixture including alnico and material having the nature of barium ferrite is decreased by about 500 oersted compared with a magnet having only barium ferrite.

Unexpectedly, it has been found that mixing two different magnetic materials having different magnetic values does not result in the addition of values exceeding those of the individual materials. For example, mixing alnico and another permanent magnet material having the nature of barium ferrite results in an increase in remanence of around 1,400 gauss. However, the coercive force of such material is decreased by about 500 oersted as compared with a magnet formed only of barium ferrite.

With a mixture of the type described, the considerable loss of coercive force, while gaining in remanence, makes the magnets particularly susceptible to demagnetizing influences and fluctuations in temperature. Material having the nature of barium ferrite has a very high change in inductance with changes in temperature. A permanent magnet formed from materail having the nature of barium ferrite has a changing inductance of around 2 percent for each 10° C. change in temperature. For this reason, a molded magnet material consisting of an intimate mixture of alnico and barium ferrite is suitable for only a few fields and does not succeed in practice for magnetic suspension bearings.

SUMMARY OF THE INVENTION

In accordance with the present invention, a permanent magnet of the type described is formed from two separate layers of permanent magnet material having different magnetic values. More specifically, the magnet of the present invention includes two individual layers formed from two different mixtures of powdered permanent magnet material and a synthetic resin binder.

With the arrangement of the present invention, it has been found possible to construct a permanent magnet having an extremely high coercive force of more than 1,660 oersted and a permeability of substantially unity. In addition, the improved permanent magnet of the present invention is arranged with one thin layer having a very high coercive force and a second layer of greater thickness having a lesser coercive force. The second layer of greater thickness also has a small error or change in inductance with changes in temperature.

As previously described, attempts to vary properties of different permanent magnet material have been carried out by making substantially homogeneous mixtures of different materials. In accordance with the present application, the permanent magnet includes at least two different layers or components, each made from a different mixture of powdered permanent magnet material and synthetic resin binder. In other words, the improved permanent magnet of the present invention does not consist of an intimate or homogeneous mixture of two different components. The improved magnet of the present invention relates to different layers wherein one layer has a high coercive force and forms only a thin layer upon the other thicker layer having a vary high resistance to changes in inductance with changes in temperature.

With the arrangement of the present application, it has been surprisingly noted that the magnetic properties of the second material, which have more magnetic material of high induction, are not unfavorably influenced by the thinner layer having a very high coercive force but a relatively high error in temperature. Instead, the magnetic properties of the thicker layer are protected by the thinner layer having a very high coercive force. The thinner layer having a very high coercive force protects the thicker layer against demagnetizing influences. Since the thickner layer is relatively protected by the thinner layer against demagnetizing influences, it is possible to use material having a relatively high error in temperature for the thinner layer having high coercive force.

Due to the small thickness of the first layer, which has a very high coercive force, its error in inductance with changes in temperature can be ignored so that no magnetic shunt material is required. That is, arranging the magnet in different layers, with one thin layer having a high coercive force, and the other having a great resistance to changes in inductance with changes in temperature, makes it possible to produce a magnet having high stability without requiring temperature compensation shunts or the like.

In addition to the advantages described, it has been found that a composite magnet can be produced by using a relatively thin layer of material having a high coercivity, such as permanent magnet material comprising alloys of rare earths and cobalt, without greatly increasing the expense of the entire magnet.

In accordance with the present invention, the second thicker layer of permanent magnet material having the lower coercive force is at least three times the thickness of the first layer of permanent magnet material having an extremely high coercive force.

In the preferred arrangement, permanent magnets constructed in accordance with the present invention have the thin layer of high coercive force facing the air gap between magnets in the magnetic suspension bearing. Naturally, it is possible to provide opposite thin layers of similar material having high coercive force on each magnet.

Those skilled in the art will recognize that various materials may be used for the first layer having a very high coercive force. For example, the first layer having high coercive force may include isotropic or anisotropic barium ferrite, strontium ferrite or lead ferrite. The first layer may also include permanent magnet alloys of rare earths and cobalt. The first layer may further include such materials as manganese-aluminum or similar alloys. The second layer which forms the thicker layer having a lower coercive force may be formed of various materials including isotropic or anisotropic alnico. The second layer may also be formed of an alloy which includes iron with any of the metals including aluminum, nickel, cobalt, titanium, copper or the like.

The improved layer of permanent magnet of the present invention is produced by molding, injection molding, casting, pressing or similar procedures. The thinner layer is joined to the second thicker layer to form a single integral body. In this connection, the permanent magnet materials of the two components are powdered and separately mixed with a thermoplastic or duroplastic binder. These mixtures are laminated one upon the other in the desired sequence and then molded into a stabilized solid body. Preferably, the magnet is molded under the influence of a magnetic aligning field. This is particularly true when anisotropic permanent magnet powder is used. Thereafter, the magnet is subjected to a magnetizing field in the direction of alignment.

In accordance with a preferred arrangement, the thin first layer having a high coercive force comprises anisotropic barium ferrite permanent magnet powder mixed with a thermoplastic synthetic resin binder. This material or first layer alone has a remanence of around 3,600 gauss and a coercive force of around 2,200 oersted. For the thick layer, it is possible to use an alnico alloy having a coercive force of around 1,400 oersted and a remanence of around 8,500 gauss.

In accordance with one arrangement, an improved magnet made in accordance with the present invention has a generally cylindrical shape which includes a longitudinal axis. The thin layer of material having a high coercive force has a thickness axially of the magnet of about 0.5 millimeters. The second thicker layer has an axial thickness of around 3 millimeters. Thus, the total thickness of the magnet would be around 3.5 millimeters. In this specific embodiment, the thick layer is around 6 times the thickness of the thin layer. As previously stated, the thick layer should be at least three times the thickness of the thin layer. The diameter of the cylindrical magnet depends upon the desired load capacity of the bearing. For a single phase electricity meter the magnets are around 9-15 millimeters in diameter. For a three phase electricity meter with two or three discs, the magnets have a diameter of around 16-18 millimeters.

In forming magnets in accordance with the present application, the synthetic resin may be a phenol-formaldehyde resin. The complete magnet comprises around 6 percent by weight of the synthetic resin and around 94 percent by weight of the magnetic material.

In one arrangement, the two different magnetic materials are mixed with the synthetic resin. The corresponding quantity of each layer is determined by means of a dosing device. One mixture is first placed in the mold. The other mixture is then placed above the first mixture. The material is then pressed to form a compact magnet body with two distinct layers integrally bonded to one another. However, it will be appreciated that many other arrangements may be used for making the improved magnet of the present invention. Although it would be more expensive, it is also possible to mold each layer separately and to then bond the two layers together. The magnet materials may also be sintered in the distinct layers.

It is a principal object of the present invention to provide an improved magnet for use in magnetic suspension bearings.

It is another object of the present invention to provide an improved magnet which is not susceptible to demagnetizing influences.

It is a further object of the present invention to provide an improved magnet having a very low change in inductance with changes in temperature.

BRIEF DESCRIPTION OF THE DRAWING

The invention may take form in certain parts and arrangements of parts, a preferred embodiment of which will be described in detail in this specification and illustrated in the accompanying drawing which forms a part hereof.

DESCRIPTION OF A PREFERRED EMBODIMENT

Figure 1:
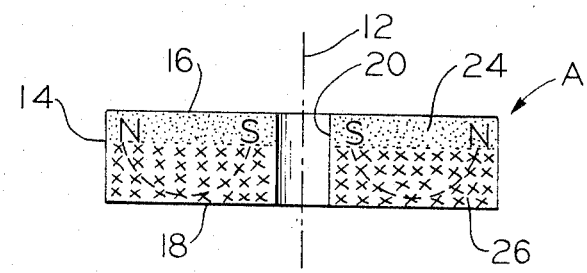
FIG. 1 is a cross-sectional elevational view of an improved magnet constructed in accordance with the present invention.

Referring now to the drawings, wherein the showings are for purposes of illustrating a preferred embodiment of the invention only and not for purposes of limiting same, FIG. 1 shows an improved permanent magnet A constructed in accordance with the present invention. Permanent magnet A has a generally cylindrical shape and includes a longitudinal axis 12. Magnet A includes a generally cylindrical outer peripheral surface 14 and opposite flat faces 16 and 18. Magnet A further includes a centrally located bore 20 therethrough. A pair of such magnets A are adapted to be mounted in axially-spaced relationship within the casing of an electricity meter to serve as a magnetic suspension bearing. Magnets A may be mounted in any desirable known manner. Known arrangements for mounting such magnets to act as a magnetic suspension bearing are disclosed in U.S. Pats. No. 3,233,950 issued Feb. 8, 1966; 3,326,610 issued June 20, 1967; and 3,597,023 issued Aug. 3, 1971. All of these patents are issued to Baermann and are hereby incorporated herein by reference. It will be recognized that many other arrangements may be used for mounting such magnets to serve as a magnetic suspension bearing. In addition, magnet A may take various shapes other than the cylindrical shape described. Particularly, face 18 may be rounded or magnet A may have an integral mounting boss molded coincidental with bore 20 on face 18. Magnets A may also have a generally flat elongated shape for use in magnetic seals or other magnetic levitation devices.

In accordance with the present invention, magnet A is formed from two distinct layers 24 and 26 of different magnetic material. First layer 24 is very thin, and is formed from a mixture of powdered permanent magnet material and a synthetic resin binder. The permanent magnet material for first thin layer 24 has a very high coercivity. With thin layer 24 having a very high coercivity, it is highly resistant to demagnetizing influences if the magnet should contact another magnet or a ferro-magnetic material during handling or assembly of a bearing.

In accordance with another aspect of the invention, second thicker layer 26 of magnet A is formed from powdered magnetic material and a synthetic resin binder. The magnetic material for second thicker layer 26 is chosen to have a very high resistance to changes in inductance with changing temperatures. In addition, second layer 26 is rather susceptible to demagnetizing influences.

With the arrangement described, first thin layer 24 having a very high coercive force is highly resistant to demagnetizing influences and protects second layer 26 from such demagnetizing influences.

As previously explained, first thin layer 24 may be formed from powdered anisotropic barium ferrite permanent magnet powder mixed with a thermoplastic synthetic resin binder. The first layer then has a remanence of around 3,600 gauss and a coercive force of around 2,200 oersted. Thick layer 26 may be formed from anisotropic alnico alloy having a coercive force of around 1,400 oersted and a remanence of around 8,500 gauss. As previously explained, various other materials may be used for the distinct layers.

Figure 2:
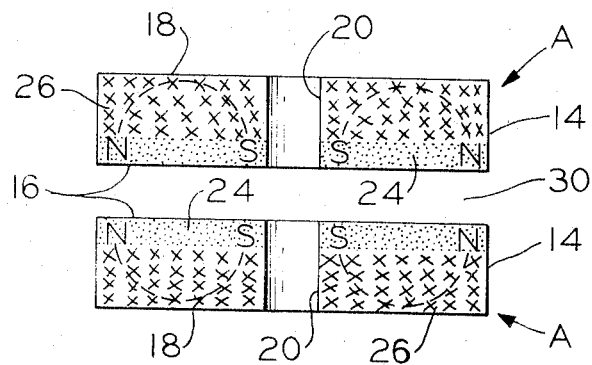
FIG. 2 is a cross-sectional elevational view of two magnets constructed in accordance with the present invention and showing how they are positioned to act as a magnetic suspension bearing in an electricity meter.

FIG. 2 shows a pair of magnets A in the positions they occupy when assembled in a magnetic suspension bearing of an electricity meter. Lower magnet A is usually fastened to the casing or frame of the electricity meter, while upper magnet A is usually fastened to the rotor shaft. Each magnet A is magnetized to have a pair of opposite magnetic poles identified by numerals N and S on face 16. Opposite poles N and S are circular around entire face 16 and are radially spaced from one another. It will be recognized that it is also possible to magnetize magnet A so that a plurality of opposite radially spaced poles occupy face 16. In addition, it is possible to provide one pole on peripheral surface 14 and an opposite magnetic pole on face 16. Furthermore, it is also possible to provide poles on face 16 with corresponding counterpoles on the opposite face 18. In any event, magnet A is magnetized so that at least one pole is on face 16 of thin layer 24 having the greater coercive force. Furthermore, the pair of magnets A are positioned with faces 16 of thin layer 24 facing one another across air gap 30. Lines of magnetic force extending between the opposite poles on each magnet into air gap 30 repulse one another to maintain air gap 30 and provide the magnetic suspension bearing.

Although the invention has been described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

Having thus described my invention, I claim:

1. A permanent magnet formed of powdered permanent magnet material and a binder, said magnet having first and second layers, said first layer having a coercivity substantially higher than said second layer.

2. The magnet of claim 1 wherein said first layer has a thickness substantially less than the thickness of said second layer.

3. The magnet of claim 2 wherein said first layer has a permeability of substantially unity.

4. The magnet of claim 3 wherein said first layer has a coercivity of at least 1,600 oersted.

5. The magnet of claim 4 wherein said second layer has a small variation in induction with fluctuations in temperature.

6. The magnet of claim 1 wherein said first layer has a thickness substantially less than the thickness of said second layer.

7. The magnet of claim 1 wherein said first layer has a coercivity of at least 1,600 oersted.

8. The magnet of claim 1 wherein said first layer has a permeability of substantially unity.

9. The magnet of claim 1 wherein said second layer has a thickness at least three times the thickness of said first layer.

10. The magnet of claim 1 wherein said first and second layers are molded together into a unitary mass.

11. The magnet of claim 1 and including an additional magnet to provide a pair of magnets, said pair of magnets being positionable in an electricity meter to provide a magnetic suspension bearing with said first layers of said magnets facing one another across an air gap.

12. The magnet of claim 1 wherein said second layer includes powdered permanent magnet material comprising an alloy of iron.

13. The magnet of claim 12 wherein said first layer includes non-metallic powdered permanent magnet material.

14. The magnet of claim 1 wherein said first layer includes non-metallic powdered permanent magnet material.

* * * * *